US010381661B2

(12) United States Patent
Ohmori et al.

(10) Patent No.: US 10,381,661 B2
(45) Date of Patent: Aug. 13, 2019

(54) RESIN FRAME EQUIPPED MEMBRANE ELECTRODE ASSEMBLY FOR FUEL CELL

(71) Applicant: HONDA MOTOR CO., LTD., Minato-Ku, Tokyo (JP)

(72) Inventors: Suguru Ohmori, Wako (JP); Masashi Sugishita, Wako (JP); Takashi Kato, Wako (JP); Yukihito Tanaka, Wako (JP); Seiji Sugiura, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 75 days.

(21) Appl. No.: 15/207,971

(22) Filed: Jul. 12, 2016

(65) Prior Publication Data
US 2017/0018785 A1    Jan. 19, 2017

(30) Foreign Application Priority Data

Jul. 16, 2015  (JP) .................................. 2015-142111
Jul. 29, 2015  (JP) .................................. 2015-149288
Jul. 29, 2015  (JP) .................................. 2015-149295

(51) Int. Cl.
*H01M 8/0273*  (2016.01)
*H01M 8/0284*  (2016.01)
*H01M 8/1004*  (2016.01)
*H01M 8/242*   (2016.01)
*H01M 8/0276*  (2016.01)
*H01M 8/1018*  (2016.01)

(52) U.S. Cl.
CPC ....... *H01M 8/0273* (2013.01); *H01M 8/0276* (2013.01); *H01M 8/242* (2013.01); *H01M 8/0284* (2013.01); *H01M 2008/1095* (2013.01); *H01M 2250/20* (2013.01); *Y02T 90/32* (2013.01)

(58) Field of Classification Search
None
See application file for complete search history.

(56) References Cited

U.S. PATENT DOCUMENTS 7,741,243 B2   6/2010   Yoshizawa
9,118,043 B2   8/2015   Kinoshita
(Continued)

FOREIGN PATENT DOCUMENTS

JP   2006-344428 A   12/2006
JP   2007-066766 A    3/2007
(Continued)

OTHER PUBLICATIONS

Office Action dated Oct. 30, 2018 issued over a corresponding Japanese Patent Application No. 2015-142111 with the English translation thereof.
(Continued)

*Primary Examiner* — Christopher P Domone
(74) *Attorney, Agent, or Firm* — Carrier Blackman & Associates, P.C.; William D. Blackman; Joseph P. Carrier

(57) ABSTRACT

A resin frame equipped membrane electrode assembly includes an MEA having different sizes of components and a resin frame member. A clearance is formed between an outer end of a second gas diffusion layer and an inner expansion. The second electrode layer has a frame shaped outer marginal portion provided at the clearance. The crack density of cracks of the frame shaped outer marginal portion is 30 cracks/mm$^2$ or less, and the interval between the cracks is 0.06 mm or more.

5 Claims, 10 Drawing Sheets

(56) References Cited

U.S. PATENT DOCUMENTS

| | | | | |
|---|---|---|---|---|
| 2007/0287044 A1* | 12/2007 | Arthur | ............. | H01M 8/04097 |
| | | | | 429/415 |
| 2012/0258379 A1* | 10/2012 | Fukuta | ............... | H01M 8/0206 |
| | | | | 429/457 |
| 2013/0183604 A1* | 7/2013 | Tanaka | ............... | H01M 8/0289 |
| | | | | 429/480 |
| 2017/0263952 A1* | 9/2017 | Terada | ............... | H01M 8/0273 |

FOREIGN PATENT DOCUMENTS

| | | |
|---|---|---|
| JP | 2008-052933 A | 3/2008 |
| JP | 2009-101351 A | 5/2009 |
| JP | 2011-204468 A | 10/2011 |
| JP | 2014-216232 A | 11/2014 |
| JP | 2015-060621 A | 3/2015 |
| WO | 2009/116630 A1 | 9/2009 |

OTHER PUBLICATIONS

Office Action dated Oct. 30, 2018 issued over another corresponding Japanese Patent Application No. 2015-149288 with the English translation thereof.

* cited by examiner

RESIN FRAME EQUIPPED MEMBRANE ELECTRODE ASSEMBLY FOR FUEL CELL

CROSS-REFERENCE TO RELATED APPLICATIONS

This application is based upon and claims the benefit of priority from Japanese Patent Applications No. 2015-142111 filed on Jul. 16, 2015, No. 2015-149288 filed on Jul. 29, 2015 and No. 2015-149295 filed on Jul. 29, 2015, the contents all of which are incorporated herein by reference.

BACKGROUND OF THE INVENTION

Field of the Invention

The present invention relates to a resin frame equipped membrane electrode assembly for a fuel cell. The resin frame equipped membrane electrode assembly includes an MEA having different sizes of components, i.e., an MEA including a solid polymer electrolyte membrane and a first electrode and a second electrode having different surface sizes sandwiching the solid polymer electrolyte membrane. Further, the resin frame equipped membrane electrode assembly includes a resin frame member provided around the MEA.

Description of the Related Art

In general, a solid polymer electrolyte fuel cell employs a solid polymer electrolyte membrane. The solid polymer electrolyte membrane is a polymer ion exchange membrane. The fuel cell includes a membrane electrode assembly (MEA) where an anode and a cathode are provided on both sides of the solid polymer electrolyte membrane. Each of the anode and the cathode includes a catalyst layer (electrode catalyst layer) and a gas diffusion layer (porous carbon).

In the fuel cell, the membrane electrode assembly is sandwiched between separators (bipolar plates) to form a power generation cell (unit cell). A predetermined number of the power generation cells are stacked together to form a fuel cell stack. In use, for example, the fuel cell stack is mounted in a vehicle as an in-vehicle fuel cell stack.

In some cases, the membrane electrode assembly has structure where components of the MEA have different sizes, i.e., the surface size of one of gas diffusion layers is smaller than the surface size of the solid polymer electrolyte membrane, and the surface size of the other of the gas diffusion layers is the same as the surface size of the solid polymer electrolyte membrane. In this regard, for the purpose of reducing the amount of expensive material used for the solid polymer electrolyte membranes, and protecting the thin solid polymer electrolyte membranes having low strength, frame equipped MEAs including resin frame members around the solid polymer electrolyte membranes have been adopted.

For example, a membrane electrode assembly disclosed in Japanese Laid-Open Patent Publication No. 2007-066766 is known. In the membrane electrode assembly, an anode catalyst layer and an anode gas diffusion layer are provided on one surface of a membrane, and a cathode catalyst layer and a cathode gas diffusion layer are provided on the other surface of the membrane to form an MEA. The outer sizes of the anode catalyst layer and the anode gas diffusion layer are the same as the outer size of the membrane. The outer sizes of the cathode catalyst layer and the cathode gas diffusion layer are smaller than the outer size of the membrane. Thus, the MEA has different sizes of components.

The surface size of the anode gas diffusion layer is larger than the surface size of the cathode gas diffusion layer. The outer end of the membrane adjacent to the cathode gas diffusion layer and a gasket structural body are joined together through an adhesion portion. In the structure, the outer end of the cathode gas diffusion layer and the inner end of the gasket structure body are positioned to face each other.

SUMMARY OF THE INVENTION

In the case of joining the membrane and gasket structural body, a clearance (gap) tends to be formed between the outer end of the cathode gas diffusion layer and the inner end of the gasket structural body. Therefore, when cracks formed in the cathode catalyst layer adjacent to the membrane are present at the clearance, in some cases, stress concentration occurs in the membrane having an elastic modulus lower than that of the cathode catalyst layer.

Therefore, for example, by the differential pressure between the pressure of supplying the fuel gas to the anode and the pressure of supplying the oxygen-containing gas to the cathode, the membrane is deformed, and consequently, mechanical degradation of the membrane may occur undesirably. In particular, in the case where the pressure of the fuel gas is larger than the pressure of the oxygen-containing gas, the membrane is deformed easily, and consequently, mechanical degradation of the membrane may occur undesirably. Further, due to moisture conditions, large dimensional changes occur easily in the membrane in comparison with other members. As a result of stress concentration, cracks, etc. may be formed in the membrane undesirably.

Further, as described above, at the time of joining the membrane and the gasket structural body, a clearance (gap) tends to be formed easily between the outer end of the cathode gas diffusion layer and the inner end of the gasket structural body. Therefore, the strength of the membrane provided at the clearance is lowered. For example, the membrane may be deformed undesirably due to the differential pressure between the pressure of supplying the fuel gas to the anode and the pressure of supplying the oxygen-containing gas to the cathode.

The present invention has been made to solve the problem of this type, and an object of the present invention is to provide a resin frame equipped membrane electrode assembly for a fuel cell in which, with simple structure, it is possible to prevent stress concentration in a solid polymer electrolyte membrane due to cracks of an electrode catalyst layer provided at a clearance of a resin frame membrane, and suitably suppress deformation of the solid polymer electrolyte membrane.

Further, another object of the present invention is to provide a resin frame equipped membrane electrode assembly in which, with simple structure, by improving the tightening force for tightening a solid polymer electrolyte membrane provided at a clearance of a resin frame member and an electrode catalyst layer together, it is possible to suitably suppress deformation of the solid polymer electrolyte membrane.

A resin frame equipped membrane electrode assembly for a fuel cell according to the first invention includes an MEA having different sizes of components and a resin frame member. The MEA includes a first electrode provided on one surface of a solid polymer electrolyte membrane and a second electrode provided on another surface of the solid polymer electrolyte membrane. The first electrode includes a first electrode catalyst layer and a first gas diffusion layer. The second electrode includes a second electrode catalyst layer and a second gas diffusion layer. A surface size of the first electrode is larger than a surface size of the second electrode. A resin frame member is provided around the solid polymer electrolyte membrane.

The resin frame member has an inner expansion expanded toward the second electrode, and a clearance is formed between an outer end of the second gas diffusion layer and an inner end of the inner expansion. The second electrode catalyst layer has a frame shaped outer marginal portion extending outward from the outer end of the second gas diffusion layer. The frame shaped outer marginal portion is provided at the clearance. Further, the crack density of cracks formed in the frame shaped outer marginal portion is 30 cracks/mm$^2$ or less, and the interval between the cracks is 0.06 mm or more.

In the first invention, the second electrode catalyst layer has the frame shaped outer marginal portion provided at the clearance. The crack density of cracks formed in the frame shaped outer marginal portion is 30 cracks/mm$^2$ or less, and the interval between the cracks is 0.06 mm or more. In the structure, it is possible to suitably suppress occurrence of stress concentration in the solid polymer electrolyte membrane, and prevent deformation of the solid polymer electrolyte membrane.

Therefore, when the external load is applied to the resin frame equipped membrane electrode assembly, with the simple structure, it is possible to prevent stress concentration in the solid polymer electrolyte membrane due to cracks of the electrode catalyst layer provided at the clearance of the resin frame member. Accordingly, it becomes possible to suitably suppress deformation of the solid polymer electrolyte membrane, and prevent mechanical degradation of the solid polymer electrolyte membrane.

A resin frame equipped membrane electrode assembly for a fuel cell according to the second invention includes an MEA having different sizes of components and a resin frame member. The MEA includes a first electrode provided on one surface of a solid polymer electrolyte membrane and a second electrode provided on another surface of the solid polymer electrolyte membrane. The first electrode includes a first electrode catalyst layer and a first gas diffusion layer. The second electrode includes a second electrode catalyst layer and a second gas diffusion layer. A surface size of the first electrode is larger than a surface size of the second electrode. A resin frame member is provided around the solid polymer electrolyte membrane.

The resin frame member has an inner expansion expanded toward the second electrode, and a clearance is formed between an outer end of the second gas diffusion layer and an inner end of the inner expansion. The second electrode catalyst layer has a frame shaped outer marginal portion extending outward from the outer end of the second gas diffusion layer. The frame shaped outer marginal portion is provided at the clearance. The length of cracks formed in the frame shaped outer marginal portion along an inner side of the resin frame member is 300 μm or less.

In the second invention, the cracks are formed in the frame shaped outer marginal portion provided at the clearance. The length of the cracks along an inner side of the resin frame member is 300 μm or less. In the structure, it is possible to suitable suppress occurrence of stress concentration in the solid polymer electrolyte membrane, and prevent deformation of the solid polymer electrolyte membrane. Therefore, when the external load is applied to the resin frame equipped membrane electrode assembly, with the simple structure, it is possible to prevent stress concentration in the solid polymer electrolyte membrane due to cracks of the electrode catalyst layer provided at the clearance of the resin frame member. Accordingly, it becomes possible to suitably suppress deformation of the solid polymer electrolyte membrane, and prevent mechanical degradation of the solid polymer electrolyte membrane.

A resin frame equipped membrane electrode assembly for a fuel cell according to the third invention includes an MEA having different sizes of components and a resin frame member. The MEA includes a first electrode provided on one surface of a solid polymer electrolyte membrane and a second electrode provided on another surface of the solid polymer electrolyte membrane. The first electrode includes a first electrode catalyst layer and a first gas diffusion layer. The second electrode includes a second electrode catalyst layer and a second gas diffusion layer. A surface size of the first electrode is larger than a surface size of the second electrode. A resin frame member is provided around the solid polymer electrolyte membrane.

The resin frame member has an inner expansion expanded toward the second electrode. A clearance is formed between an outer end of the second gas diffusion layer and an inner end of the inner expansion. In a thickness direction of the MEA, at a portion facing the clearance of the first electrode, the solid polymer electrolyte membrane and the first electrode catalyst layer are configured to be tightened together by a tightening force of 0.2 N/mm or more.

Further, preferably, the second electrode catalyst layer is provided to cover the solid polymer electrolyte membrane in a thickness direction of the solid polymer electrolyte membrane at the clearance.

Further, the first electrode is an anode to which a fuel gas is supplied, and the second electrode is a cathode to which an oxygen-containing gas is supplied, and a pressure of supplying the fuel gas to the first electrode is larger than a pressure of supplying the oxygen-containing gas to the second electrode.

In the third invention, in the thickness direction of the MEA, at a portion facing the clearance of the first electrode, the solid polymer electrolyte membrane and the first electrode catalyst layer are configured to be tightened together by a tightening force of 0.2 N/mm or more. Therefore, with the simple structure, it is possible to suitably improve the tightening force for tightening the solid polymer electrolyte membrane facing the clearance and the first electrode layer together. Therefore, when the external load is applied to the resin frame equipped membrane electrode assembly, it is possible to reliably prevent deformation of the solid polymer electrolyte membrane facing the clearance, and prevent mechanical degradation of the solid polymer electrolyte membrane.

The above and other objects, features and advantages of the present invention will become more apparent from the following description when taken in conjunction with the accompanying drawings in which a preferred embodiment of the present invention is shown by way of illustrative example.

DESCRIPTION OF THE PREFERRED EMBODIMENTS

Figure 1:
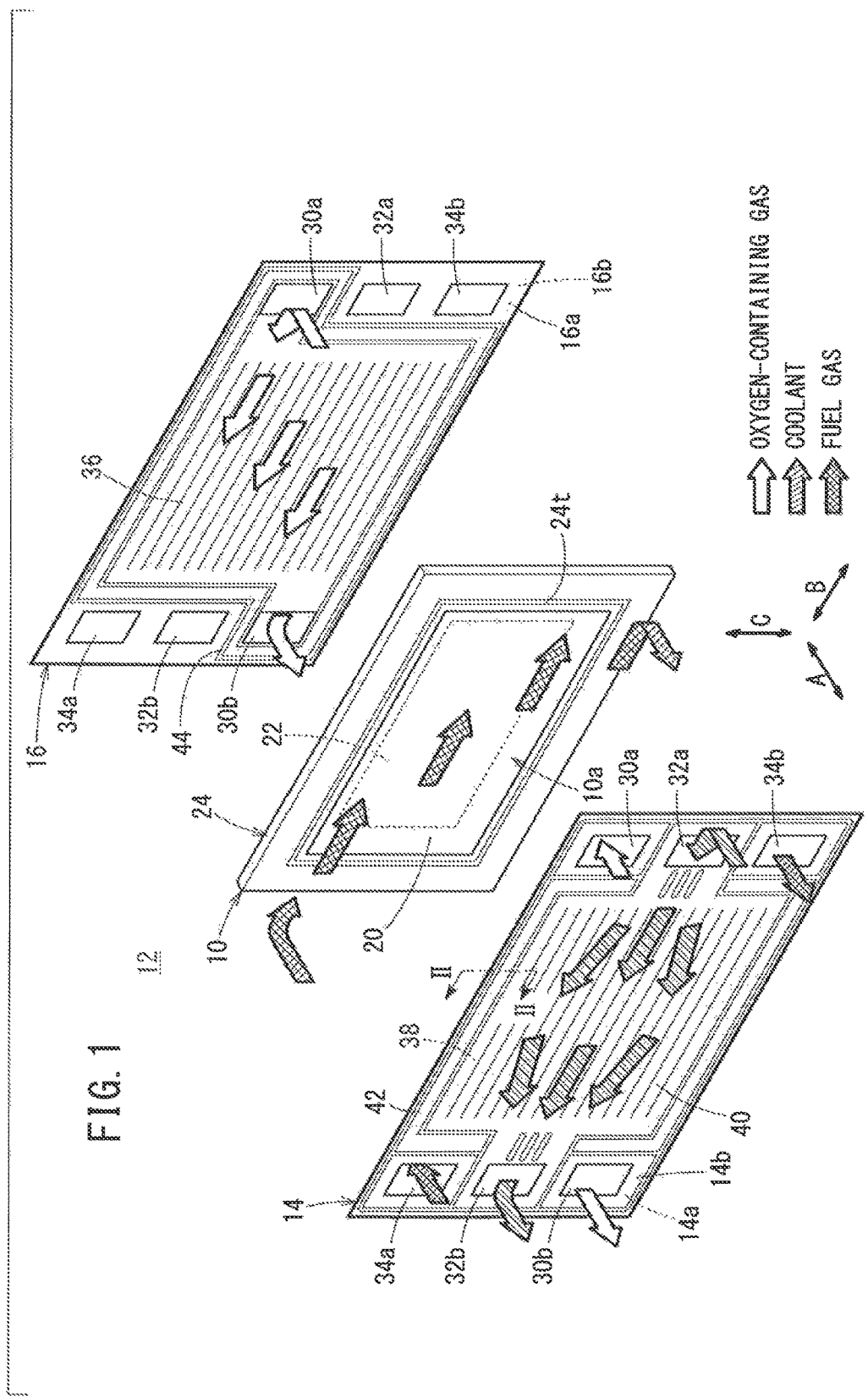
FIG. 1 is an exploded perspective view showing main parts of a solid polymer power generation cell including a resin frame equipped membrane electrode assembly according to an embodiment of the present invention.
Figure 2:
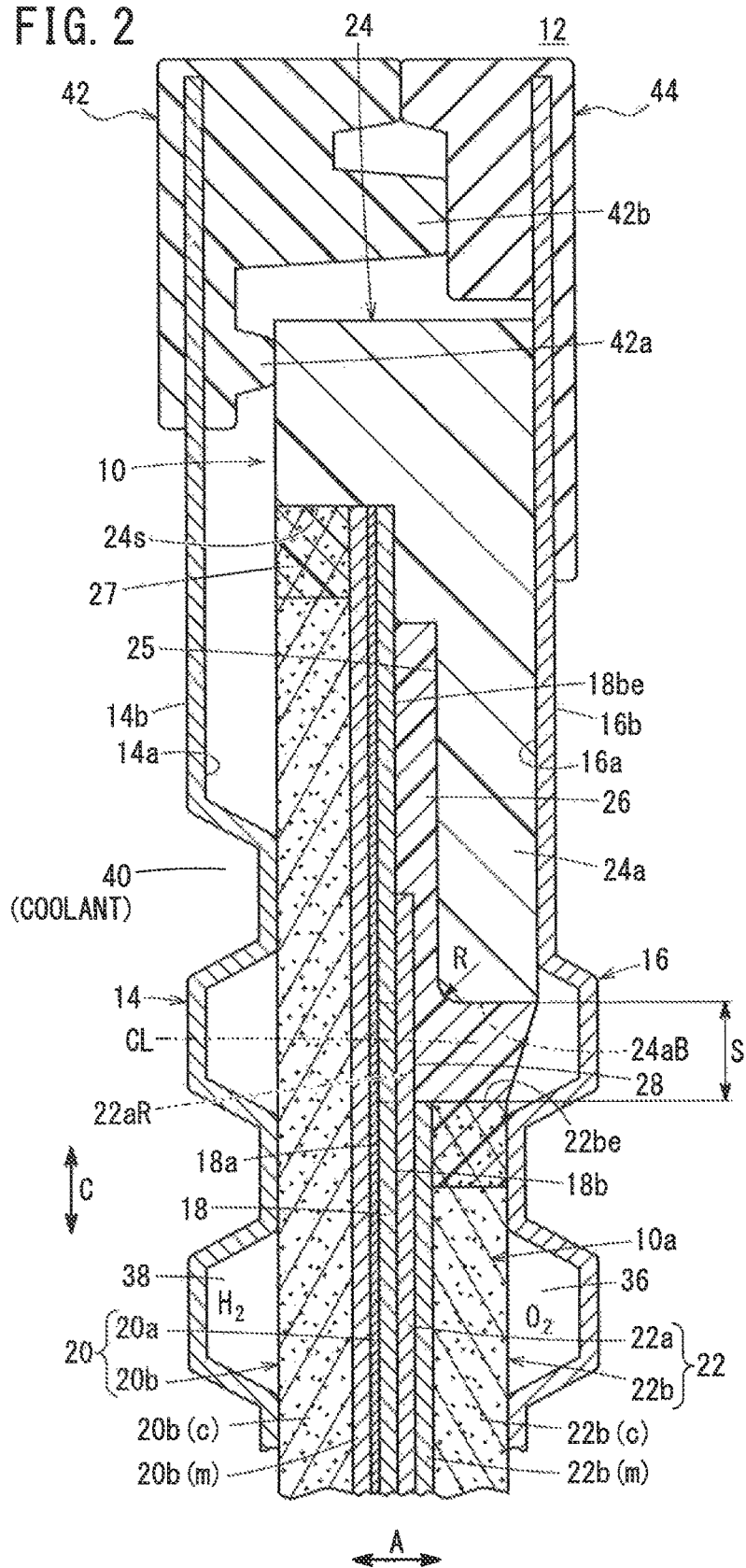
FIG. 2 is a cross sectional view showing the power generation cell, taken along a line II-II in FIG. 1.

As shown in FIGS. 1 and 2, a resin frame equipped membrane electrode assembly 10 according to an embodiment of the present invention is included in a laterally elongated (or longitudinally elongated) rectangular solid polymer power generation cell 12. A plurality of the power generation cells 12 are stacked together in a horizontal direction indicated by an arrow A or in a gravity direction indicated by an arrow C to form the fuel cell stack. For example, the fuel cell stack is mounted as an in-vehicle fuel cell stack, in a fuel cell electric automobile (not shown).

The power generation cell 12 is formed by sandwiching the resin frame equipped membrane electrode assembly 10 between a first separator 14 and a second separator 16. Each of the first separator 14 and the second separator 16 has a laterally elongated (or longitudinally elongated) rectangular shape. For example, the first separator 14 and the second separator 16 are made of metal plates such as steel plates, stainless steel plates, aluminum plates, plated steel sheets, or metal plates having anti-corrosive surfaces by surface treatment. Alternatively, carbon members may be used as the first separator 14 and the second separator 16.

As shown in FIG. 2, the rectangular frame equipped membrane electrode assembly 10 includes an MEA (membrane electrode assembly having different sizes of components) 10a. As shown in FIG. 2, the MEA 10a includes a solid polymer electrolyte membrane (cation ion exchange membrane) 18 formed by impregnating a thin membrane of perfluorosulfonic acid with water, for example. The solid polymer electrolyte membrane 18 is interposed between an anode (first electrode) 20 and a cathode (second electrode) 22. A fluorine based electrolyte may be used as the solid polymer electrolyte membrane 18. Alternatively, an HC (hydrocarbon) based electrolyte may be used as the solid polymer electrolyte membrane 18.

The surface size (outer size) of the cathode 22 is smaller than the surface sizes (outer sizes) of the solid polymer electrolyte membrane 18 and the anode 20. Instead of adopting the above structure, the surface size of the anode 20 may be smaller than the surface sizes of the solid polymer electrolyte membrane 18 and the cathode 22. In this case, the anode 20 is the second electrode, and the cathode 22 is the first electrode.

Figure 3:
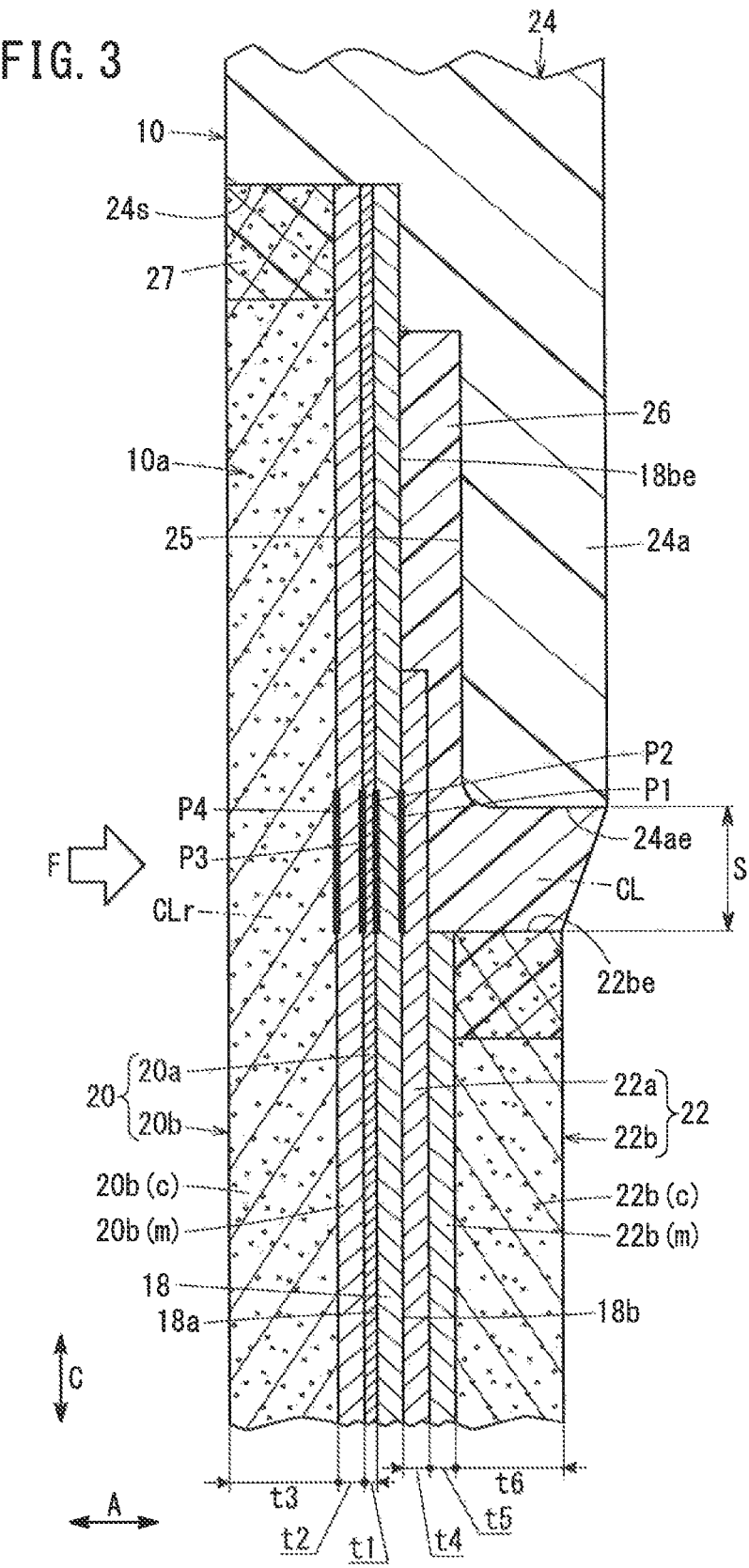
FIG. 3 is a cross sectional view showing main components of the resin frame equipped membrane electrode assembly.

As shown in FIGS. 2 and 3, the anode 20 includes a first electrode catalyst layer 20a joined to one surface 18a of the solid polymer electrolyte membrane 18 and a first gas diffusion layer 20b stacked on the first electrode catalyst layer 20a. The surface size of the first electrode catalyst layer 20a and the surface size of the first gas diffusion layer 20b are the same, and are the same as or smaller than the surface size of the solid polymer electrolyte membrane 18.

The cathode 22 includes a second electrode catalyst layer 22a joined to a surface 18b of the solid polymer electrolyte membrane 18 and a second gas diffusion layer 22b stacked on the second electrode catalyst layer 22a. The second electrode catalyst layer 22a protrudes outward from an outer end 22be of the second gas diffusion layer 22b. The surface size of the second electrode catalyst layer 22a is larger than the surface size of the second gas diffusion layer 22b, and smaller than the surface size of the solid polymer electrolyte membrane 18. The second electrode catalyst layer 22a is provided to cover (or provided on) the solid polymer electrolyte membrane 18 in the thickness direction of the solid polymer electrolyte membrane 18 at clearance CL described later (see FIG. 3). Since the solid polymer electrolyte membrane 18 is not exposed at the clearance CL, the solid polymer electrolyte membrane 18 is protected, and the solid polymer electrolyte membrane 18 is reinforced.

For example, the first electrode catalyst layer 20a is formed by porous carbon particles together with an ion conductive polymer binder deposited uniformly on the one surface 18a of the solid polymer electrolyte membrane 18. Platinum alloy is supported on the porous carbon particles. For example, the second electrode catalyst layer 22a is formed by porous carbon particles together with an ion conductive polymer binder deposited uniformly on the surface 18b of the solid polymer electrolyte membrane 18. Platinum alloy is supported on the porous carbon particles.

The first gas diffusion layer 20b includes a microporous layer 20b(m) having porosity and electrical conductivity and a carbon layer 20b(c) such as a carbon paper or a carbon cloth. The second gas diffusion layer 22b includes a microporous layer 22b(m) and a carbon layer 22b(c) such as a carbon paper or a carbon cloth. The surface size of the second gas diffusion layer 22b is smaller than the surface size of the first gas diffusion layer 20b. The first electrode catalyst layer 20a and the second electrode catalyst layer 22a are formed on both surfaces of the solid polymer electrolyte membrane 18. The microporous layers 20b(m), 22b(m) should be used as necessary, and may not be used.

As shown in FIG. 3, for the anode 20, the thickness t1 of the first electrode catalyst layer 20a, the thickness t2 of the microporous layer 20b(m), and the thickness t3 of the carbon layer 20b(c) are determined. For the cathode 22, the thickness t4 of the second electrode catalyst layer 22a, the thickness t5 of the microporous layer 22b(m), and the thickness t6 of the carbon layer 22b(c) are determined.

These thicknesses t1 to t6 satisfy the following relationship: t3 or t6>t4≥t2 or t5>t1.

Specifically, the thickness t1 is in a range of 2 μm to 10 μm, the thickness t2 and t5 are in a range of 10 μm to 40 μm, the thickness t3 and t6 are in a range of 100 μm to 300 μm, and the thickness t4 is in a range of 10 μm to 40 μm, The bending elastic modulus is determined to satisfy the following relationship: carbon layer 20b(c) or carbon layer 22b(c)>second electrode catalyst layer 22a≥microporous layer 20b(m) or micro porous layer 22b(m)>first electrode catalyst layer 20a.

The resin frame equipped membrane electrode assembly 10 is formed around the solid polymer electrolyte membrane 18, and includes a resin frame member 24 joined to the anode 20 and the cathode 22. Instead of the resin frame member 24, a resin film, etc. having a uniform thickness may be used.

For example, the resin frame member 24 is made of PPS (Poly Phenylene Sulfide), PPA (polyphthalamide), PEN (polyethylene naphthalate), PES (polyethersulfone), LCP (liquid crystal polymer), PVDF (polyvinylidene fluoride), a silicone resin, a fluororesin, or m-PPE (modified Poly Phenylene Ether) resin. Alternatively, the resin frame member 24 may be made of PET (polyethylene naphthalate), PBT (polybutylene terephthalate), or modified polyolefin.

Figure 4:
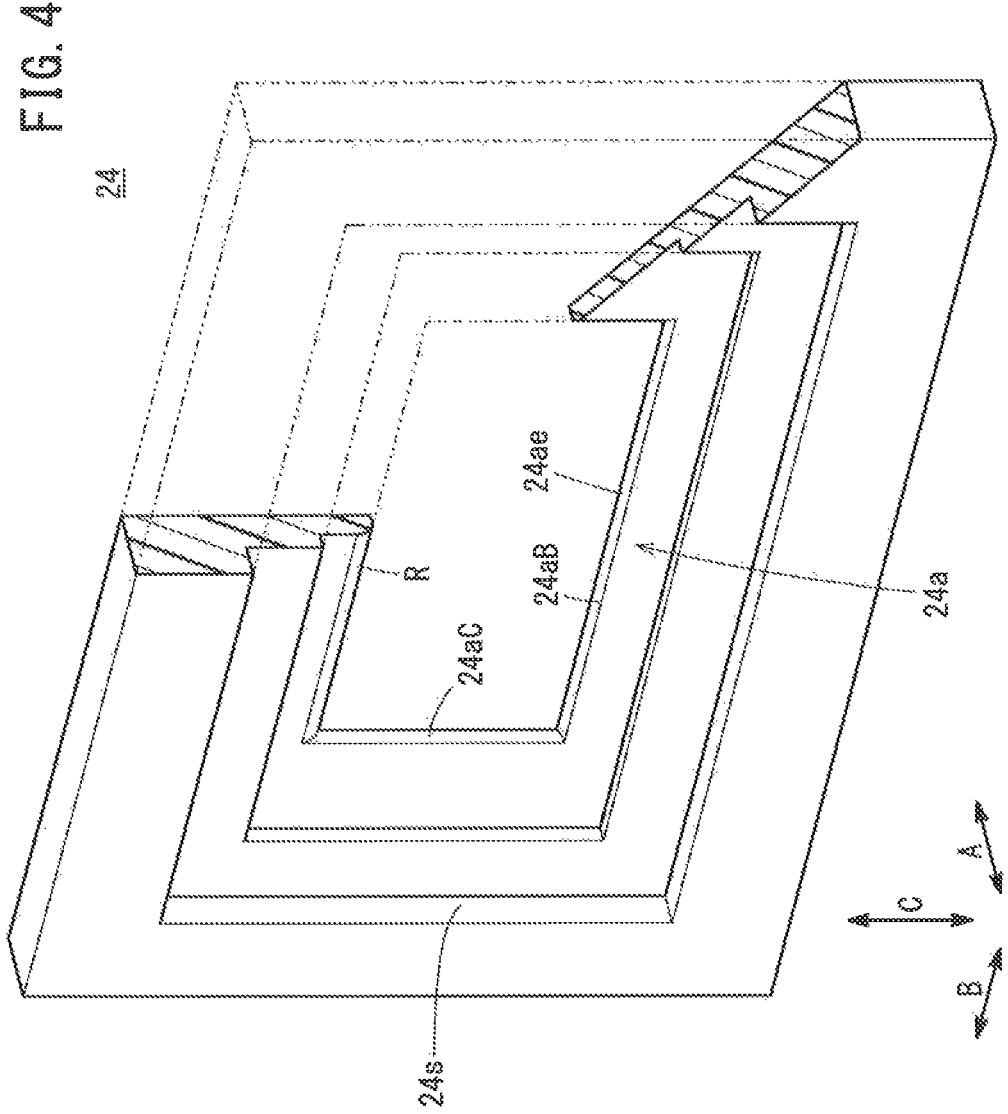
FIG. 4 is a perspective view, partially in cross section, of a resin frame of the resin frame equipped membrane electrode assembly.

As shown in FIGS. 1 and 4, the resin frame member 24 has a frame shape. As shown in FIGS. 2 and 3, the resin frame member 24 has a thin inner expansion 24a expanded from an inner proximal end 24s of the resin frame member 24 toward the cathode 22 through a step. The inner expansion 24a extends inward from the inner proximal end 24s by a predetermined length, and covers an outer end surface 18be of the solid polymer electrolyte membrane 18. The inner expansion 24a has an inner end surface 24ae (inner sides 24aB, 24aC) having an R portion (curved surface) in its inner corner.

As shown in FIG. 1, a resin projection 24t is provided integrally with the resin frame member 24, adjacent to the inner proximal end 24s (see FIG. 2). As described later, the resin projection 24t is melted, and the outer marginal portion of the first gas diffusion layer 20b of the anode 20 is impregnated with the melted resin of the resin projection 24t to form a frame shaped resin impregnation portion 27 (see FIGS. 2 and 3).

Figure 5:
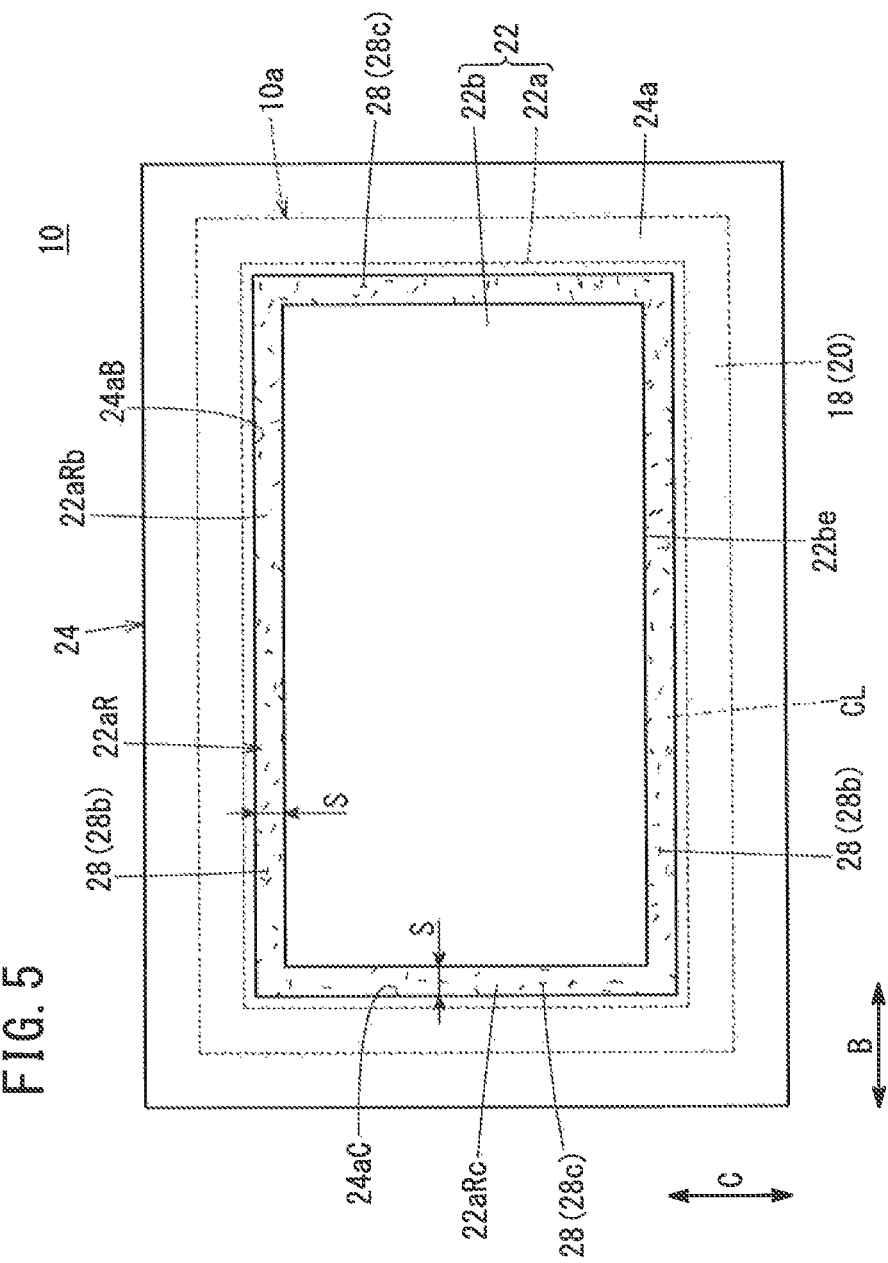
FIG. 5 is a front view showing the resin frame equipped membrane electrode assembly.

As shown in FIG. 5, the inner side 24aB is an inner long side of the resin frame member 24 extending in the longitudinal direction indicated by an arrow B. The inner side 24aC is an inner short side of the resin frame member 24 extending in the lateral direction indicated by an arrow C.

As shown in FIG. 2, a filling chamber 25 is provided between the inner expansion 24a and the MEA 10a, and an adhesive layer 26 is formed in the filling chamber 25. As the adhesive layer 26, for example, a liquid seal or hot melt adhesive is provided. The adhesive is not limited to liquid or solid adhesive, and not limited to thermoplastic or thermosetting adhesive.

As shown in FIG. 5, the clearance CL is formed between the outer end 22be of the second gas diffusion layer 22b and the inner sides 24aB, 24aC (inner end surface 24ae) of the inner expansion 24a. The inner sides 24aB, 24aC are spaced from the outer end 22be of the second gas diffusion layer 22b by the distance S, respectively. The width of the clearance CL is the same distance S in each of the inner sides 24aB, 24aC. However, the clearance CL may have different widths in the inner sides 24aB, 24aC, respectively. The second electrode catalyst layer 22a includes a frame shaped outer marginal portion 22aR provided at the clearance CL (see FIGS. 2 and 5). The frame shaped outer marginal portion 22aR extends outside the outer end 22be of the second gas diffusion layer 22b. The frame shaped outer marginal portion 22aR and the inner expansion 24a include portions overlapped with each other in the stacking direction. The frame shaped outer marginal portion 22aR includes a portion overlapped with an inner circumferential portion of the inner expansion 24a when observed in the stacking direction, and the frame shaped outer marginal portion 22aR is sandwiched between the solid polymer electrolyte membrane 18 and the adhesive layer 26.

In the manufacturing process of the second electrode catalyst layer 22a, a plurality of cracks 28 are inevitably formed in the frame shaped outer marginal portion 22aR (see FIG. 5). The crack density of the cracks 28 has a predetermined value, and the interval between the cracks 28 is a predetermined interval or more. The crack density indicates the number of cracks 28 present in a predetermined unit of area. The interval between the cracks 28 is the shortest distance between the cracks 28, regardless of the shapes or the sizes of the cracks 28.

Specifically, the crack density is 30 cracks/mm$^2$ or less, preferably, 20 cracks/mm$^2$ or less, and more preferably, 13 cracks/mm$^2$ or less. The interval between the cracks 28 is 0.06 mm or more, preferably, 0.07 mm or more, and more preferably, 0.08 mm or more.

As shown in FIG. 5, a plurality of cracks 28c, 28b are formed in the frame shaped outer marginal portion 22aR. Cracks 28c are formed in a short portion 22aRc of the frame shaped outer marginal portion 22aR extending in the direction indicated by the arrow C, and cracks 28b are formed in a long portion 22aRb of the frame shaped outer marginal portion 22aR extending in the direction indicated by the arrow B. The cracks 28b, 28c are formed during manufacturing process of the second electrode catalyst layer 22a.

Figure 6:
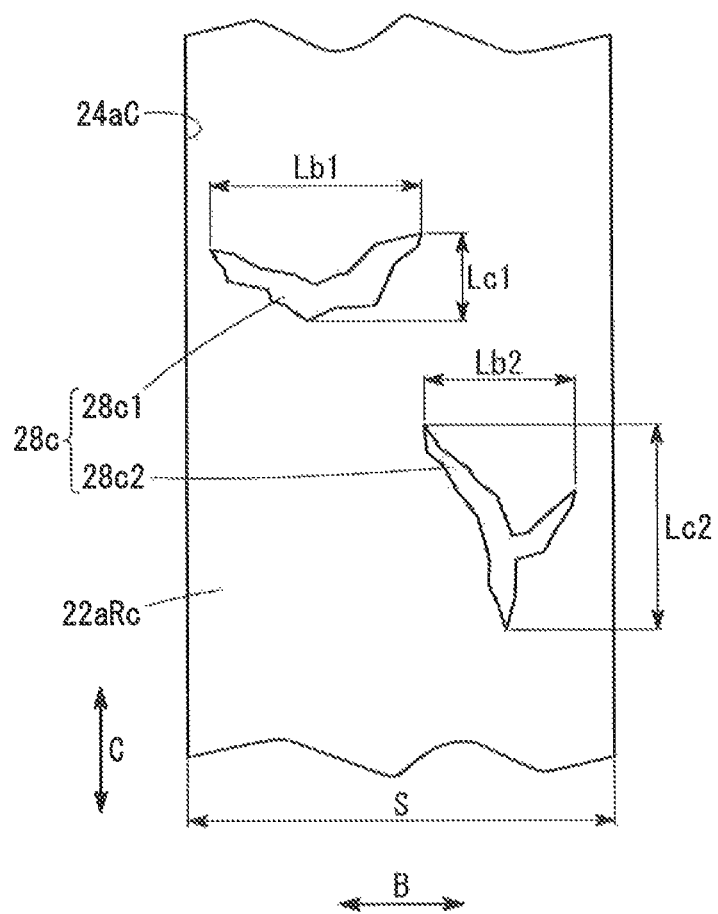
FIG. 6 is a partial enlarged view showing cracks formed in one part of a frame shaped outer marginal portion of a second electrode catalyst layer.

As shown in FIG. 6, in the short portion 22aRc, cracks 28c1, 28c2, etc. having different shapes are formed as the cracks 28c. The crack 28c1 has a length Lb1 in the direction indicated by the arrow B and has a length Lc1 in the direction indicated by the arrow C. The crack 28c2 has a length Lb2 in the direction indicated by the arrow B and has a length Lc2 in the direction indicated by the arrow C. The lengths Lc1, Lc2 of the cracks 28c1, 28c2 along the inner side 24aC of the resin frame member 24 has a predetermined value or less. Specifically, the predetermined value is 300 µm or less, and preferably, 120 µm or less.

Figure 7:
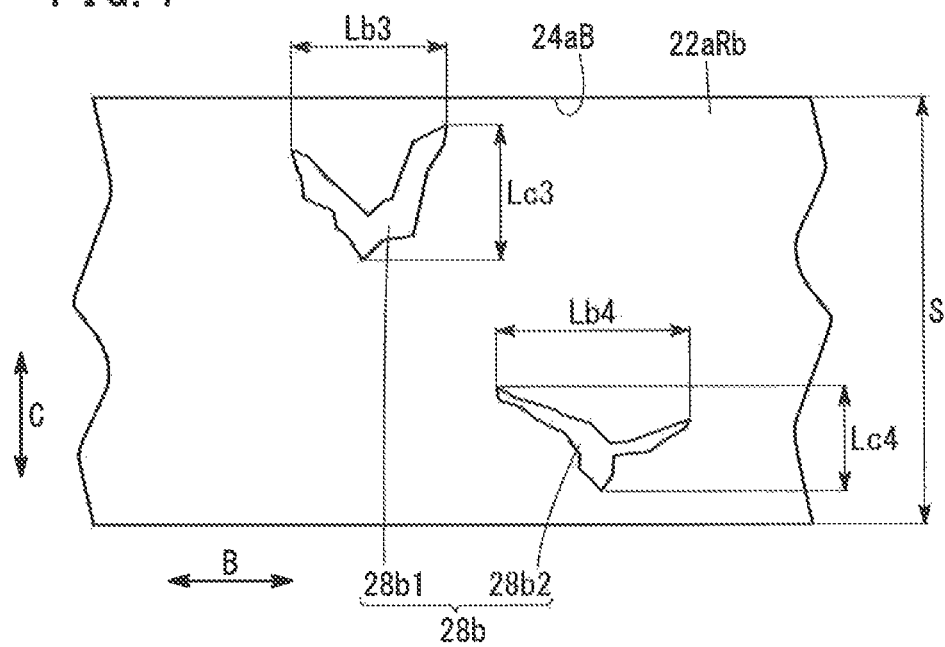
FIG. 7 is a partial enlarged view showing cracks formed on the other part of the frame shaped outer marginal portion.

As shown in FIG. 7, in the long portion 22aRb, cracks 28b1, 28b2, etc. having different shapes are formed as the cracks 28b. The crack 28b1 has a length Lb3 in the direction indicated by the arrow B and has a length Lc3 in the direction indicated by the arrow C. The crack 28b2 has a length Lb4 in the direction indicated by the arrow B and has a length Lc4 in the direction indicated by the arrow C. The lengths Lb3, Lb4 of the cracks 28b1, 28b2 along the inner side 24aB of the resin frame member 24 has a predetermined value or less. Specifically, the predetermined value is 300 µm or less, and preferably, 120 µm or less In FIG. 2, the distance S is in a range of 0.5 mm to 1.2 mm, and more preferably, in a range of 0.6 mm to 1.0 mm. The distance S is the width of the clearance CL having a frame shape.

As shown in FIG. 3, the frame shaped portion CLr facing the clearance CL of the anode 20 is provided in the thickness direction of the MEA 10a indicated by the arrow A. The portion CLr has an area covering the clearance CL having the distance S, and the dimension of the portion CLr (in the direction indicated by the arrow C) is larger than the distance S, e.g., by 1.0 mm to 2.0 mm (width). The solid polymer electrolyte membrane 18 and the first electrode catalyst layer 20a are configured to be tightened together by a tightening force of 0.2 N/mm or more.

Specifically, the load and the temperature for hot pressing of the solid polymer electrolyte membrane 18 and the first electrode catalyst layer 20a are adjusted. As the load gets larger, the tightening force becomes large. As the temperature gets higher, the tightening force becomes large. Further, the quantity of the ion exchange component for the catalyst supporting carbon in the first electrode catalyst layer 20a is adjusted. As the quantity of the ion exchange component increases, the tightening force becomes large.

In the portion CLr, the position P1 of joining the solid polymer electrolyte membrane 18 and the second electrode catalyst layer 22a, and the position P2 of joining the solid polymer electrolyte membrane 18 and the first electrode catalyst layer 20a are determined. Further, for the portion CLr, the position P3 of joining the first electrode catalyst layer 20a and the microporous layer 20b(m), and the position P4 of joining the microporous layer 20b(m) and the carbon layer 20b(c) are determined. The joining strengths at the joining positions P1 to P4 are determined to satisfy the following relationship: P1<P2<P3<P4.

As shown in FIG. 1, at one end of the power generation cell 12 in the horizontal direction indicated by the arrow B, an oxygen-containing gas supply passage 30a, a coolant supply passage 32a, and a fuel gas discharge passage 34b are provided. The oxygen-containing gas supply passage 30a, the coolant supply passage 32a, and the fuel gas discharge passage 34b extend through the power generation cell 12 in the stacking direction indicated by the arrow A. The oxygen-containing gas is supplied through the oxygen-containing gas supply passage 30a, and the coolant is supplied through the coolant supply passage 32a. A fuel gas such as a hydrogen-containing gas is discharged through the fuel gas discharge passage 34b. The oxygen-containing gas supply passage 30a, the coolant supply passage 32a, and the fuel gas discharge passage 34b are arranged in the vertical direction indicated by the arrow C.

At the other end of the power generation cell 12 in the direction indicated by the arrow B, a fuel gas supply passage 34a for supplying the fuel gas, a coolant discharge passage 32b for discharging the coolant, and an oxygen-containing gas discharge passage 30b for discharging the oxygen-containing gas are provided. The fuel gas supply passage 34a, the coolant discharge passage 32b, and the oxygen-containing gas discharge passage 30b extend through the power generation cell 12 in the direction indicated by the arrow A. The fuel gas supply passage 34a, the coolant discharge passage 32b, and the oxygen-containing gas discharge passage 30b are arranged in the direction indicated by the arrow C.

The second separator 16 has an oxygen-containing gas flow field 36 on its surface 16a facing the resin frame equipped membrane electrode assembly 10. The oxygen-containing gas flow field 36 is connected to the oxygen-containing gas supply passage 30a and the oxygen-containing gas discharge passage 30b. The oxygen-containing gas flow field 36 extends in the direction indicated by the arrow B.

The first separator 14 has a fuel gas flow field 38 on its surface 14a facing the resin frame equipped membrane electrode assembly 10. The fuel gas flow field 38 is connected to the fuel gas supply passage 34a and the fuel gas discharge passage 34b. The fuel gas flow field 38 extends in the direction indicated by the arrow B. The pressure of supplying the fuel gas flowing through the fuel gas flow field 38 is larger than the pressure of supplying the oxygen-containing gas flowing through the oxygen-containing gas flow field 36. In the MEA 10a, the differential pressure between the anode 20 and the cathode 22 (differential pressure between the electrodes) may be generated by the difference in the pressures of supplying the reactant gases.

A coolant flow field 40 is formed between a surface 14b of the first separator 14 and a surface 16b of the second separator 16. The coolant flow field 40 is connected to the coolant supply passage 32a and the coolant discharge passage 32b. The coolant flow field 40 extends in the direction indicated by the arrow B.

As shown in FIGS. 1 and 2, a first seal member 42 is formed integrally with the surfaces 14a, 14b of the first separator 14, around the outer end of the first separator 14. A second seal member 44 is formed integrally with the surfaces 16a, 16b of the second separator 16, around the outer end of the second separator 16.

As shown in FIG. 2, the first seal member 42 includes a first ridge seal 42a which contacts the resin frame member 24 of the resin frame equipped membrane electrode assembly 10 and a second ridge seal 42b which contacts the second seal member 44 of the second separator 16. The surface of the second seal member 44 which contacts the second ridge seal 42b forms a flat seal having a flat surface extending along the separator surface. It should be noted that, instead of using the second ridge seal 42b, a ridge seal (not shown) may be provided in the second seal member 44.

Each of the first seal member 42 and the second seal member 44 is an elastic seal member made of seal material, cushion material, or packing material such as an EPDM (ethylene propylene diene monomer) rubber, an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

Next, a method of producing the resin frame equipped membrane electrode assembly 10 will be described.

Firstly, the MEA 10a is produced, and the resin frame member 24 is formed by injection molding using the die (not shown). In the MEA 10a, slurry as a mixture of carbon black and PTFE (polytetrafluoroethylene) particles is applied to the flat surface of the carbon paper, and dried to form a microporous layer 20b(m) as an underlying layer.

The carbon layer 20b(c) is joined to the micro porous layer 20b(m) to form the first gas diffusion layer 20b. Likewise, the micro porous layer 22b(m) is formed, and the carbon layer 22b(c) is joined to the microporous layer 22b(m) to form the second gas diffusion layer 22b.

In the meanwhile, after a solvent is added to electrode catalyst, as ion conductive polymer binder solution, for example, solution of perfluoroalkylene sulfonic acid polymer compound is added. Then, the solvent is added until the viscosity reaches a predetermined ink viscosity to create anode ink and cathode ink.

Next, the anode ink is applied to a PET film by screen printing, and dried by heating to form an anode sheet having the first electrode catalyst layer 20a. The surface size of the first electrode catalyst layer 20a is the same as the surface size of the solid polymer electrolyte membrane 18.

Likewise, the cathode ink is applied to a PET film by screen printing, and dried by heating to form a cathode sheet having the second electrode catalyst layer 22a. The surface area of the second electrode catalyst layer 22a is smaller than the surface area of the solid polymer electrolyte membrane 18.

Then, in the state where the solid polymer electrolyte membrane 18 is sandwiched between the anode sheet and the cathode sheet, hot pressing is performed. Then, by peeling off the PET film, a catalyst coated membrane (CCM) is formed. Then, the CCM is sandwiched between the first gas diffusion layer 20b and the second gas diffusion layer 22b, and these components are joined together by hot pressing to form the MEA 10a.

Then, adhesive is applied to the outer end surface 18be of the solid polymer electrolyte membrane 18, e.g., using a dispenser (not shown). In the state where the adhesive is applied to the outer end surface 18be of the solid polymer electrolyte membrane 18, the portion of joining the outer end surface 18be of the solid polymer electrolyte membrane 18 and the inner expansion 24a of the resin frame member 24 is heated, and pressurized. As a result, the adhesive is hardened to form an adhesive layer 26.

Then, the resin projection 24t of the resin frame member 24 is heated, and pressurized by a die (not shown) which contacts the resin projection 24t. As a heating method, any of laser heating, infrared heating, impulse heating, heater heating, etc. may be adopted. Therefore, the resin projection 24t is melted by heating, and the first gas diffusion layer 20b of the anode 20 is impregnated with the melted resin of the resin projection 24t to provide the resin impregnation portion 27. In this manner, the resin frame equipped membrane electrode assembly 10 is produced.

As shown in FIG. 2, the resin frame equipped membrane electrode assembly 10 is sandwiched between the first separator 14 and the second separator 16. The second separator 16 contacts the inner expansion 24a of the resin frame member 24. The second separator 16 and the first separator 14 apply the load to the resin frame equipped membrane electrode assembly 10. Further, a predetermined number of the power generation cells 12 are stacked together, and a tightening load is applied to components between end plates (not shown).

Operation of the power generation cell 12 having the above structure will be described below.

Firstly, as shown in FIG. 1, an oxygen-containing gas is supplied to the oxygen-containing gas supply passage 30a, and a fuel gas such as a hydrogen-containing gas is supplied to the fuel gas supply passage 34a. Further, a coolant such as pure water, ethylene glycol, or oil is supplied to the coolant supply passage 32a.

Thus, the oxygen-containing gas flows from the oxygen-containing gas supply passage 30a to the oxygen-containing gas flow field 36 of the second separator 16. The oxygen-containing gas moves in the direction indicated by the arrow B, and the oxygen-containing gas is supplied to the cathode 22 of the MEA 10a. In the meanwhile, the fuel gas is supplied from the fuel gas supply passage 34a to the fuel gas flow field 38 of the first separator 14. The fuel gas flows along the fuel gas flow field 38 in the direction indicated by the arrow B, and the fuel gas is supplied to the anode 20 of the MEA 10a.

Thus, in each MEA 10a, the oxygen-containing gas supplied to the cathode 22 and the fuel gas supplied to the anode 20 are partially consumed by electrochemical reactions in the second electrode catalyst layer 22a and the first electrode catalyst layer 20a for generating electricity.

Then, the oxygen-containing gas partially consumed at the cathode 22 is discharged along the oxygen-containing gas discharge passage 30b in the direction indicated by the arrow A. Likewise, the fuel gas partially consumed at the anode 20 is discharged along the fuel gas discharge passage 34b in the direction indicated by the arrow A.

Further, the coolant supplied to the coolant supply passage 32a is supplied into the coolant flow field 40 between the first separator 14 and the second separator 16. Then, the coolant flows in the direction indicated by the arrow B. After the coolant cools the MEA 10a, the coolant is discharged from the coolant discharge passage 32b.

Figure 8:
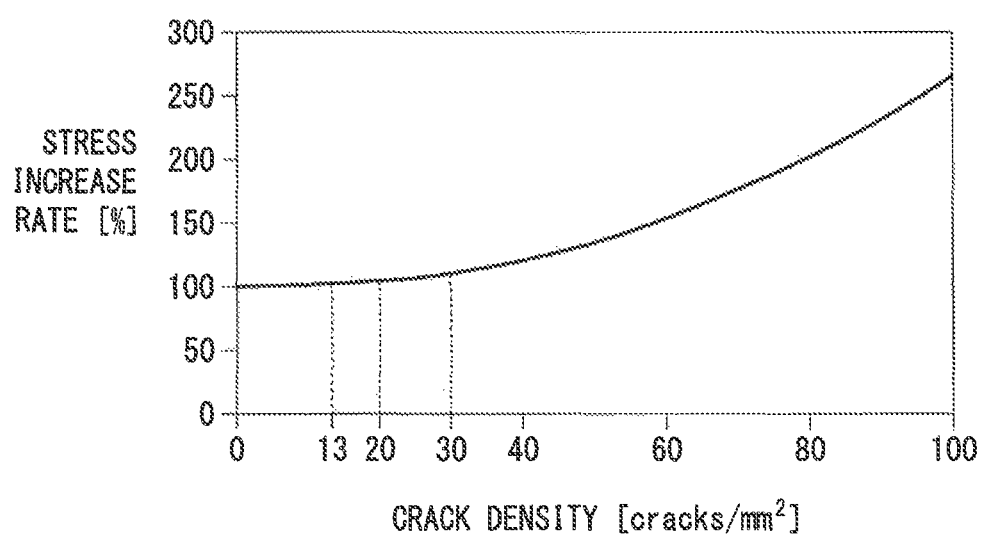
FIG. 8 is a graph showing the relationship between the crack density and the rate of increase in the stress applied to a solid polymer electrolyte membrane.

In the embodiment of the present invention, the crack density of the cracks 28 is 30 cracks/$mm^2$ or less, preferably, 20 cracks/$mm^2$ or less, and more preferably, 13 cracks/$mm^2$ or less. In this regard, FIG. 8 shows the relationship between the crack density and the rate of increase in the stress applied to the solid polymer electrolyte membrane 18 (stress increase rate). If the crack density exceeds 30 cracks/$mm^2$, the stress increase rate becomes large sharply, and stress concentration may occur in the solid polymer electrolyte membrane 18. If the crack density is 20 cracks/$mm^2$ or less, the stress increase rate is very small. Further, if the crack density is 13 cracks/$mm^2$ or less, the stress increase rate has a substantially constant value. The stress increase rate does not depend on the material characteristics of the first electrode catalyst layer 20a and the second electrode catalyst layer 22a.

Figure 9:
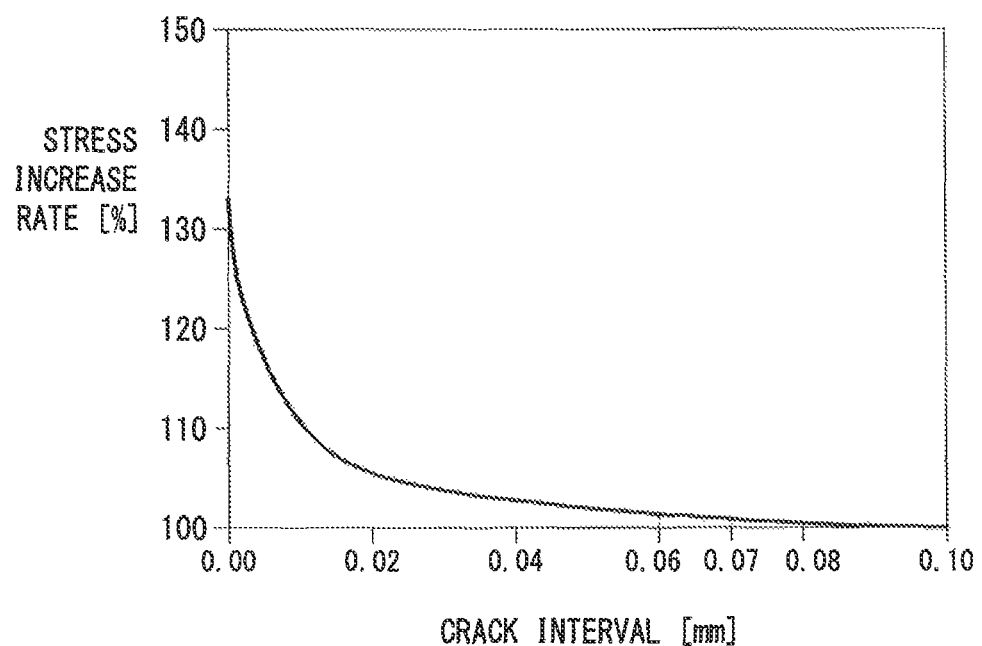
FIG. 9 is a graph showing the relationship between the interval between cracks (crack interval) and the rate of increase in the stress applied to the solid polymer electrolyte membrane (stress increase rate)

Further, in the embodiment of the present invention, the interval between the cracks 28 is 0.06 mm or more, preferably, 0.07 mm or more, and more preferably, 0.08 mm or more. FIG. 9 shows the relationship between the crack interval and the stress increase rate of the solid polymer electrolyte membrane 18. If the interval between the cracks 28 is 0.06 mm or less, the stress increase rate becomes large sharply, and stress concentration may occur in the solid polymer electrolyte membrane 18. If the crack interval is 0.07 mm or more, the stress increase rate is very small. If the crack interval is 0.08 mm or more, the stress increase rate has substantially a constant value. The stress increase rate does not depend on the material characteristics of the first electrode catalyst layer 20a and the second electrode catalyst layer 22a.

As described above, the embodiment of the present invention is configured to have a small crack density, and a large crack interval. Unlike the embodiment of the present invention, if the crack density is large and the crack interval is small, the function the second electrode catalyst layer 22a (frame shaped outer marginal portion 22aR) corresponding to the clearance CL as a support body is degraded. Therefore, stress concentration may occur in the solid polymer electrolyte membrane 18.

As described above, in the embodiment of the present invention, deformation of the solid polymer electrolyte membrane 18 having a relatively low elastic modulus is suppressed suitably, and it becomes possible to prevent mechanical degradation of the solid polymer electrolyte membrane 18 advantageously. Further, it is possible to prevent deformation of the solid polymer electrolyte membrane 18 due to swelling or contraction of the solid polymer electrolyte membrane 18.

Further, in the embodiment of the present invention, as shown in FIG. 6, the lengths Lc1, Lc2 of the cracks 28c1, 28c2 along the inner short sides 24aC of the resin frame member 24 have a predetermined value or less. Specifically, the predetermined value is 300 μm or less, and preferably, 120 μm or less. As shown in FIG. 7, the lengths Lb3, Lb4 of the cracks 28b1, 28b2 along the long inner side 24aB of the resin frame member 24 have a predetermined value or less. Specifically, the predetermined value is 300 μm or less, and preferably, 120 μm or less.

Figure 10:
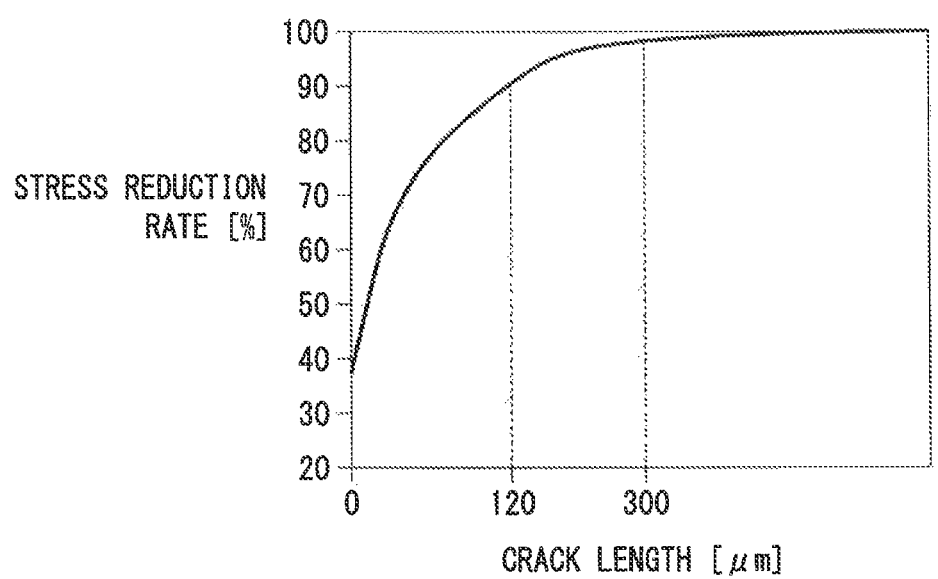
FIG. 10 is a graph showing the relationship between the length of the cracks (crack length) and the rate of reduction in the stress applied to the solid polymer electrolyte membrane (stress reduction rate).

Next, FIG. 10 shows the relationship between the crack length and the rate of reduction in the stress applied to the solid polymer electrolyte membrane 18 (stress reduction rate). As the crack length gets shorter, the stress reduction becomes large (reduction rate becomes small). When the crack length becomes 300 μm or less, the stress reduction becomes noticeable. Further, if the clack length becomes 120 μm or less, the stress reduction becomes significant.

As shown in FIG. 2, in the MEA 10a, in the presence of the clearance CL, a load resulting from the differential pressure between the electrodes tends to be applied from the anode 20 to the cathode 22. Further, the solid polymer electrolyte membrane 18 tends to be deformed easily due to swelling or contraction, in comparison with other members.

In particular, in the embodiment of the present invention, lengths Lc1, Lc2 of the cracks 28c1, 28c2 along the inner side 24aC of the resin frame member 24 is 300 μm or less (see FIG. 6). Further, the length Lb3, Lb4 of the cracks 28b1, 28b2 along the inner side 24aB of the resin frame member 24 is 300 μm or less (see FIG. 7).

Therefore, the stress reduction rate is not affected by the lengths Lb1, Lb2, Lc3, and Lc4 significantly. It is sufficient to limit the values of the lengths Lc1, Lc2, Lb3, and Lb4. It is because the amount of deformation of the solid polymer electrolyte membrane 18 is large in the lengths Lc1, Lc2, Lb3, and Lb4, and the stress reduction rate is affected by the lengths Lc1, Lc2, Lb3, and Lb4 significantly.

Therefore, by limiting the crack length of the cracks 28c, 28b formed in the frame shaped outer marginal portion 22aR, when an external load is applied to the resin frame equipped membrane electrode assembly 10, occurrence of stress concentration in the solid polymer electrolyte membrane 18 can be prevented.

In the structure, it is possible suitably suppress deformation of the solid polymer electrolyte membrane 18 having a relatively low elastic modulus, and prevent mechanical degradation of the solid polymer electrolyte membrane 18 advantageously. Further, it is possible to suppress deformation of the solid polymer electrolyte membrane 18 due to swelling or contraction of the solid polymer electrolyte membrane 18.

In the embodiment of the present invention, as shown in FIG. 3, the clearance CL is formed between the inner end surface 24ae of the inner expansion 24a of the resin frame member 24 and the outer end 22be of the second gas diffusion layer 22b. In the structure, by forming the adhesive layer 26 at the clearance CL, it is possible join the MEA 10a and the resin frame member 24 firmly and suitably.

Further, in the thickness direction of the MEA 10a, at the portion CLr facing the clearance CL of the anode 20, the solid polymer electrolyte membrane 18 and the first electrode catalyst layer 20a are configured to be tightened together by a tightening force of 0.2 N/mm or more.

In the embodiment of the present invention, the pressure (e.g., up to approximately 200 kPa) of supplying the fuel gas supplied to the anode 20 is larger than the pressure of the oxygen-containing gas supplied to the cathode 22. Therefore, in the MEA 10a, the load F resulting from the differential pressure between the electrodes tends to be applied to the portion CLr facing the clearance CL, from the anode 20 to the cathode 22. Further, the solid polymer electrolyte membrane 18 tends to be deformed easily due to swelling or contraction.

In this regard, at the portion CLr, the solid polymer electrolyte membrane 18 and the first electrode catalyst layer 20a are tightened together by the tightening force of 0.2 N/mm or more. Therefore, the solid polymer electrolyte membrane 18 and the first electrode catalyst layer 20a are fixed firmly. Thus, with the simple structure, it is possible to suitably improve the tightening force for tightening the solid polymer electrolyte membrane 18 facing the clearance CL and the first electrode catalyst layer 20a together.

In the structure, when the load F is applied to the resin frame equipped membrane electrode assembly 10, deformation of the solid polymer electrolyte membrane 18 facing the clearance CL is prevented reliably. Therefore, mechanical degradation of the solid polymer electrolyte membrane 18 can be prevented advantageously. Further, it is possible to suppress degradation of the solid polymer electrolyte membrane 18 due to contraction or swelling of the solid polymer electrolyte membrane 18.

While the invention has been particularly shown and described with reference to a preferred embodiment, it will be understood that variations and modifications can be effected thereto by those skilled in the art without departing from the scope of the invention as defined by the appended claims.

What is claimed is:

1. A resin frame equipped membrane electrode assembly for a fuel cell comprising:
   an MEA including a first electrode provided on one surface of a solid polymer electrolyte membrane and a second electrode provided on another surface of the solid polymer electrolyte membrane, the first electrode including a first electrode catalyst layer and a first gas diffusion layer, the second electrode including a second electrode catalyst layer and a second gas diffusion layer, a surface size of the first electrode being larger than a surface size of the second electrode; and
   a resin frame member provided around the solid polymer electrolyte membrane, wherein:
   the resin frame member has an inner expansion expanded toward the second electrode, the inner expansion spaced away from the second electrode in a stacking direction;
   a clearance is formed between an outer end of the second gas diffusion layer and an inner end of the inner expansion;
   the second electrode catalyst layer has a frame shaped outer marginal portion extending outward from the outer end of the second gas diffusion layer, the frame shaped outer marginal portion being sandwiched between the solid polymer electrolyte membrane and an adhesive layer formed at the clearance; and
   a crack density of cracks formed in the frame shaped outer marginal portion is 30 cracks/mm$^2$ or less, and an interval between two adjacent cracks is 0.06 mm or more.

2. A resin frame equipped membrane electrode assembly for a fuel cell comprising:
   an MEA including a first electrode provided on one surface of a solid polymer electrolyte membrane and a second electrode provided on another surface of the solid polymer electrolyte membrane, the first electrode including a first electrode catalyst layer and a first gas diffusion layer, the second electrode including a second electrode catalyst layer and a second gas diffusion layer, a surface size of the first electrode being larger than a surface size of the second electrode; and
   a resin frame member provided around the solid polymer electrolyte membrane, wherein:
   the resin frame member has an inner expansion expanded toward the second electrode, the inner expansion spaced away from the second electrode in a stacking direction;
   a clearance is formed between an outer end of the second gas diffusion layer and an inner end of the inner expansion;
   the second electrode catalyst layer has a frame shaped outer marginal portion extending outward from the outer end of the second gas diffusion layer, the frame shaped outer marginal portion being sandwiched between the solid polymer electrolyte membrane and an adhesive layer formed at the clearance; and
   a length of each of cracks formed in the frame shaped outer marginal portion along an inner side of the resin frame member is 300 μm or less.

3. A resin frame equipped membrane electrode assembly for a fuel cell comprising:

an MEA including a first electrode provided on one surface of a solid polymer electrolyte membrane and a second electrode provided on another surface of the solid polymer electrolyte membrane, the first electrode including a first electrode catalyst layer and a first gas diffusion layer, the second electrode including a second electrode catalyst layer and a second gas diffusion layer, a surface size of the first electrode being larger than a surface size of the second electrode, the inner expansion spaced away from the second electrode in a stacking direction; and a resin frame member provided around the solid polymer electrolyte membrane, wherein:

the resin frame member has an inner expansion expanded toward the second electrode;

a clearance is formed between an outer end of the second gas diffusion layer and an inner end of the inner expansion;

an adhesive layer is formed at the clearance; and in a thickness direction of the MEA, at a portion facing the clearance of the first electrode, the solid polymer electrolyte membrane and the first electrode catalyst layer are configured to be tightened together by a tightening force of 0.2 N/mm or more.

4. The resin frame equipped membrane electrode assembly for the fuel cell according to claim 3, wherein the second electrode catalyst layer is provided to cover the solid polymer electrolyte membrane in a thickness direction of the solid polymer electrolyte membrane at the clearance.

5. The resin frame equipped membrane electrode assembly for the fuel cell according to claim 3, wherein:

the first electrode is an anode to which a fuel gas is supplied;

the second electrode is a cathode to which an oxygen-containing gas is supplied; and a pressure of supplying the fuel gas to the first electrode is larger than a pressure of supplying the oxygen-containing gas to the second electrode.

* * * * *